(12) United States Patent
Sharpe et al.

(10) Patent No.: US 12,513,010 B2
(45) Date of Patent: Dec. 30, 2025

(54) SYSTEMS AND METHODS FOR A DIGITAL REGISTER OF MODELS MONITORING CHANGES IN ACCURACY OF ARTIFICIAL INTELLIGENCE MODELS

(71) Applicant: Capital One Services, LLC, McLean, VA (US)

(72) Inventors: Samuel Sharpe, Cambridge, MA (US); Galen Rafferty, Mahomet, IL (US); Brian Barr, Schenectady, NY (US); Austin Walters, Savoy, IL (US); Jeremy Goodsitt, Champaign, IL (US); Kenny Bean, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 782 days.

(21) Appl. No.: 17/930,035

(22) Filed: Sep. 6, 2022

(65) Prior Publication Data

US 2024/0080210 A1 Mar. 7, 2024

(51) Int. Cl.
*H04L 9/00* (2022.01)
*H04L 41/16* (2022.01)
*H04L 67/306* (2022.01)

(52) U.S. Cl.
CPC ............ *H04L 9/50* (2022.05); *H04L 41/16* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 11,569,981 B1* | 1/2023 | Mishra | G06F 21/64 |
| 12,101,399 B2* | 9/2024 | Dawson, III | H04L 9/0866 |
| 2013/0290223 A1* | 10/2013 | Chapelle | G06N 20/00 706/12 |
| 2016/0261690 A1* | 9/2016 | Ford | G06F 21/645 |
| 2017/0060988 A1* | 3/2017 | Kudo | G06F 16/285 |
| 2017/0279774 A1* | 9/2017 | Booz | G06Q 20/0658 |
| 2018/0018590 A1* | 1/2018 | Szeto | G16H 10/60 |
| 2019/0279107 A1* | 9/2019 | Wang | G06N 20/00 |
| 2019/0303790 A1* | 10/2019 | Harvilla | G06Q 20/3567 |
| 2019/0332955 A1* | 10/2019 | Manamohan | G06F 18/214 |
| 2019/0332966 A1* | 10/2019 | Gidney | G06N 20/20 |
| 2019/0334716 A1* | 10/2019 | Kocsis | G06N 3/045 |
| 2020/0019864 A1* | 1/2020 | Gu | G05B 19/4183 |

(Continued)

FOREIGN PATENT DOCUMENTS

| | | | | | |
|---|---|---|---|---|---|
| CN | 110223068 A | * | 9/2019 | | G06Q 20/389 |
| CN | 110832519 B | * | 3/2024 | | H04L 9/50 |
| CN | 116132162 B | * | 12/2024 | | H04L 9/3239 |

OTHER PUBLICATIONS

Ogundokun et al., "A Review on Federated Learning and Machine Learning Approaches," May 2022, https://www.researchgate.net/publication/360822949_A_Review_on_Federated_Learning_and_Machine_Learning_Approaches_Categorization_Application_Areas_and_Blockchain_Technology.*

*Primary Examiner* — Ryan Barrett
(74) *Attorney, Agent, or Firm* — Foley & Lardner LLP

(57) ABSTRACT

Methods and systems described herein relate to the creation of a digital repository of artificial intelligence models that allows users to determine their individual fairness metric. More specifically, the methods and systems provide this digital repository by storing it on a blockchain network and tracking any changes made to the model and/or its fairness metric.

20 Claims, 4 Drawing Sheets

(56) References Cited

U.S. PATENT DOCUMENTS

| | | | | |
|---|---|---|---|---|
| 2020/0160286 | A1* | 5/2020 | Vukich | G06Q 20/382 |
| 2020/0218940 | A1* | 7/2020 | Anglin | H04L 9/0637 |
| 2020/0250747 | A1* | 8/2020 | Padmanabhan | G06Q 20/065 |
| 2020/0272945 | A1* | 8/2020 | Manamohan | G06N 20/00 |
| 2020/0311583 | A1* | 10/2020 | Manamohan | G06N 20/00 |
| 2021/0110310 | A1* | 4/2021 | Guim Bernat | G06F 16/27 |
| 2021/0152327 | A1* | 5/2021 | Givental | H04L 9/0618 |
| 2021/0241241 | A1* | 8/2021 | Lokanath | G06Q 20/065 |
| 2021/0350891 | A1* | 11/2021 | Dods | G06N 3/088 |
| 2021/0397891 | A1* | 12/2021 | Memon | H04L 9/3239 |
| 2021/0398017 | A1* | 12/2021 | Garg | H04L 9/50 |
| 2022/0044162 | A1* | 2/2022 | Zhang | G06F 21/64 |
| 2022/0067570 | A1* | 3/2022 | Kong | G06N 20/00 |
| 2022/0138731 | A1* | 5/2022 | Cheng | G06N 20/00 |
| | | | | 705/7.34 |
| 2022/0172108 | A1* | 6/2022 | P K | G06N 20/20 |
| 2022/0345323 | A1* | 10/2022 | Aylward | G06F 21/64 |
| 2023/0040570 | A1* | 2/2023 | Cheng | G06N 3/08 |
| 2023/0359774 | A1* | 11/2023 | Zhao | G06F 21/64 |
| 2023/0419182 | A1* | 12/2023 | Wen | G06N 20/00 |
| 2024/0185090 | A1* | 6/2024 | Rafferty | G06N 20/00 |

* cited by examiner

SYSTEMS AND METHODS FOR A DIGITAL REGISTER OF MODELS MONITORING CHANGES IN ACCURACY OF ARTIFICIAL INTELLIGENCE MODELS

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. For example, results based on artificial intelligence are notoriously difficult to review as the process by which the results are made may be unknown or obscured. This obscurity creates hurdles for identifying errors in the results, as well as improving the models providing the results. These technical problems present an inherent problem with using an artificial intelligence model since it is difficult to determine how accurate the model is due to the fact that it is difficult to know what exact weights and determinations are used in the artificial intelligence model.

SUMMARY

Methods and systems are described herein for novel uses and/or improvements to determine the accuracy of artificial intelligence models. More particularly, methods and systems are described herein for solving the aforementioned technical problems of artificial intelligence models using blockchain technology.

Existing systems lack a method or system to determine how accurate an artificial intelligence model is. The reason for this is that existing artificial intelligence models or algorithms are too complex and sophisticated to definitely determine what weights and functions they use to generate results.

While absolute accuracy may be difficult, one solution for measuring the accuracy within these constraints is to measure how accurate a model is over time (e.g., to determine whether the model is getting more or less accurate). However, when attempting to determine whether the model is getting more or less accurate over time, a system needs to ensure that it is using the correct model, inputs, and outputs for comparison. This is difficult, particularly in cases where a version of a model may change over time. This is exacerbated in instances where a party that wishes to determine whether the accuracy of the model has changed does not have access to the model. In such cases, the party controlling the model could make changes to the model that are unknown to other parties.

To overcome the lack of transparency in monitoring changes in the accuracy of artificial intelligence models, methods and systems are disclosed herein for using blockchain technology to create a digital register that include publicly available information about models that may be used to determine whether or not a model is accurate. For example, one hallmark of blockchain technology is that it is decentralized and has high transparency, as well as allowing the data in the blockchain to be immutable.

However, using blockchain technology to create a digital registry of artificial intelligence models creates a novel technical problem. Specifically, storing large amounts of data on a blockchain is difficult, and accurately recording different versions of an artificial intelligence model, as well as respective inputs and outputs, would require large amounts of data.

To overcome this technical challenge, the systems and methods described herein introduce a novel technical feature. Specifically, the systems and methods describe the use of storing a plurality of identifiers in a blockchain that point to artificial intelligence model versions, inputs, and outputs. By storing the identifiers as opposed to the artificial intelligence model versions, inputs, and outputs directly, the limited storage of the blockchain is overcome while still allowing the artificial intelligence model versions, inputs, and outputs to be transparently accessed by the public. For example, the identifiers may comprise hashes of the artificial intelligence model versions. Any user wishing to verify that an off-chain model is the unaltered version may hash the off-chain model and compare the resulting hash to the one on the blockchain.

In some aspects, systems and methods for monitoring changes in the accuracy of artificial intelligence models are described. For example, the system may receive a first request to determine an accuracy metric for a first artificial intelligence model. The system may, in response to receiving the first request, access an on-chain digital repository of model attributes on a blockchain network. The system may determine a first block comprising a first attribute set for the first artificial intelligence model, wherein the first block comprises first data generated at a first time, wherein the first attribute set comprises: a first temporal network identifier corresponding to a first run time of the first artificial intelligence model, a first artificial intelligence model network identifier corresponding to the first artificial intelligence model, and a first output network identifier identifying a first given output for a first given input to the first artificial intelligence model. The system may determine a second block comprising a second attribute set for the first artificial intelligence model, wherein the second block comprises second data generated at a second time, wherein the second attribute set comprises: a second temporal network identifier corresponding to a second run time of the first artificial intelligence model, the first artificial intelligence model network identifier corresponding to the first artificial intelligence model, and a second output network identifier identifying a second given output for a second given input to the first artificial intelligence model. The system may compare the first output network identifier to the second output network identifier to determine a difference in accuracy metrics. The system may generate for display, on a user interface, a recommendation based on the difference.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
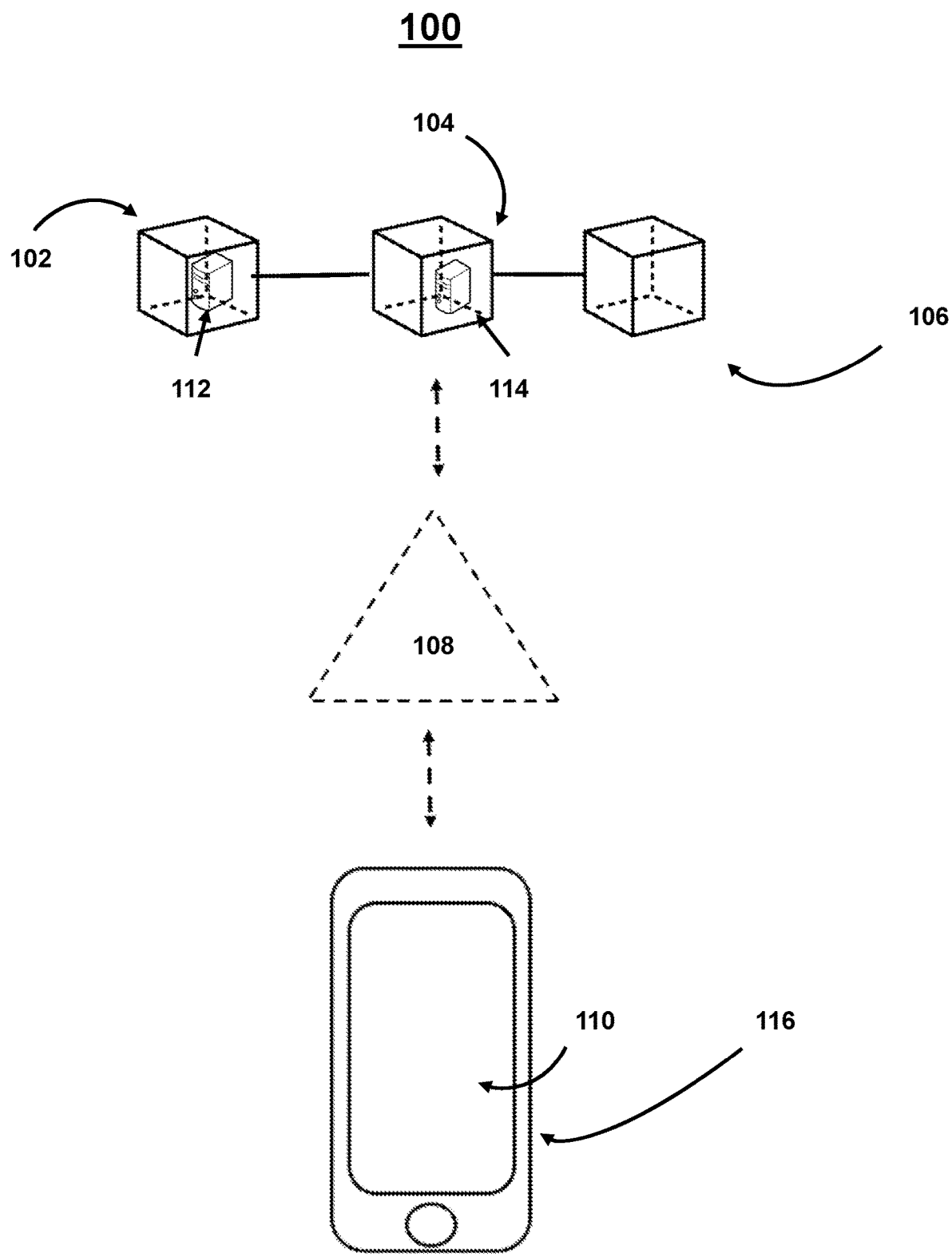
FIG. 1 shows an illustrative diagram for a digital repository of artificial intelligence models that may determine an individual fairness metric for the user, in accordance with one or more embodiments.

FIG. 1 shows an illustrative diagram for a digital repository of artificial intelligence models that may determine an individual fairness metric for the user, in accordance with one or more embodiments. For example, the system may indicate storing an artificial intelligence model on a blockchain network. For example, FIG. 1 illustrates storing particular information from the artificial intelligence models on the blockchain through identifiers. For example, by storing particular identifiers through hashed data groups, it would be extremely difficult to change the data being stored from the artificial intelligence models. As such, the system may generate a digital repository of artificial intelligence models that may determine an individual fairness metric for the user that is immutable and publicly available.

FIG. 1 shows the system 100 which includes blockchain network 106, computer program 108 and a user device 116. Blockchain network 106 includes a first block 102, which includes a first attribute set 112 and a second block 104, which includes a second attribute set 114. User device 116 includes user interface 110. Each attribute set includes a temporal network identifier, an artificial intelligence model network identifier, and an output network identifier.

The system may use a temporal network identifier. As referred to herein, a "temporal network identifier" may include data stored on the blockchain network that corresponds to a run time of the artificial intelligence model. In some embodiments, the temporal network identifier may comprise a hash value that stores the address of the off-chain digital repository that comprises the run time data. In some embodiments, the temporal network identifier may comprise a hashed data group, wherein the hashed data group stores the run time data on the blockchain network using a random nonce. In some embodiments, the temporal network identifier may comprise a hash pointer, wherein the hash pointer points to the data block within the blockchain network that stores the run time data for the artificial intelligence model.

The system may use an artificial intelligence model network identifier. As referred to herein, an "artificial intelligence model network identifier" may include the data stored on the blockchain network that corresponds to the artificial intelligence model. In some embodiments, the artificial intelligence model network identifier may comprise a hash value that stores the address of where in the off-chain digital repository the artificial intelligence model is located. In some embodiments, the artificial intelligence model network identifier may comprise a hashed data group, wherein the hashed data group stores the artificial intelligence model data on the blockchain network using a random nonce. In some embodiments, the artificial intelligence model network identifier may comprise a hash pointer, wherein the hash pointer points to the data block within the blockchain network that stores the artificial intelligence model data.

The system may use an output network identifier. As referred to herein, an "output network identifier" may include the data stored on the blockchain network that identifies a given output for a given input. In some embodiments, the output network identifier may comprise a hash value that stores the address of the off-chain digital repository that comprises the given output. In some embodiments, the output network identifier may comprise a hashed data group, wherein the hashed data group stores the output data on the blockchain network within hashes of data using a random nonce. In some embodiments, the output network identifier may comprise a hash pointer, wherein the hash pointer points to the data block within the blockchain network that stores the given output.

The system 100 may receive a first request to determine an accuracy metric for a first artificial intelligence model. The system may determine an accuracy metric. As referred to herein, an "accuracy metric" may include a metric that indicates how an artificial intelligence model is generally performing. In some embodiments, the accuracy metric may comprise a metric or score of how fair the artificial intelligence model is. In some embodiments, the accuracy metric may comprise a value that represents the number of correct predictions over the overall number of predictions. In some embodiments, the accuracy metric may comprise a value that indicates the amount of bias the artificial intelligence has against certain subgroups in the dataset when making a prediction.

To determine whether an artificial intelligence model has bias against a certain subgroup within the dataset, the system uses a validation set, wherein the validation set determines how accurate the artificial intelligence model was with the predictions and/or classifications it has made. The accuracy can be evaluated by determining the error rate. If the accuracy rate is lower for a certain subgroup in comparison to all other subgroups as well as the overall accuracy rate, then it can be concluded that the artificial intelligence model has a bias against that subgroup. However, accurate systems may still contain bias because the accuracy rate is impacted by how similar the dataset the artificial intelligence model is trained on to the dataset it is tested on. Therefore, the fairness metric can only be determined after running the dataset on numerous artificial intelligence models and determining an overall accuracy metric for the models tested.

Currently, the use of blockchain technology for various applications, including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology because it allows for the recording of information that is difficult or impossible to change (either in an authorized or unauthorized manner). For example, a blockchain is essentially a digital ledger of transactions that is duplicated and distributed across the entire network of computer systems on the blockchain. That is, the digital ledger of a blockchain is a decentralized source of information that does not require a central authority to monitor transactions, maintain records, and/or enforce rules. Instead, technology underlying the blockchain network, namely cryptography techniques (e.g., secret-key, public key, and/or hash functions), consensus mechanisms (e.g., Proof of Work ("POW"), Proof of Stake ("POS"), Delegated Proof of Stake ("dPOS"), Practical Byzantine Fault Tolerance ("pBFT"), Proof of Elapsed Time Broadly ("PoET"), etc.), and computer networks (e.g., peer-to-peer ("P2P"), the Internet, etc.) combine to provide a decentralized environment that enables the technical benefits of blockchain technology.

These technical issues present an inherent problem with attempting to use a blockchain technology-based solution in storing a digital register that may be used to determine whether or not a model is accurate on the blockchain since it is difficult to search and store information on the blockchain. For example, blockchains by their nature provide a limited amount of storage space. The system overcomes this limitation by storing only particular information on the blockchain (e.g., temporal identifier, a model identifier, and output identifier). Notably, through the use of this information, the digital register and models stored thereon may be identified and verified. By storing these particular identifiers, the system may easily be able to identify models and datasets within the digital register. Overall, by utilizing this system on the blockchain, the system is able to identify and verify that the models have not changed, unless a second version of it has been uploaded to the blockchain.

In response to receiving the first request, the system 100 may access an on-chain digital repository of model attributes on a blockchain network 106. The system 100 may determine a first block 102 comprising a first attribute set 112 for the first artificial intelligence model, wherein the first block 102 comprises first data generated at a first time, wherein the first attribute set 112 comprises: a first temporal network identifier corresponding to a first run time of the first artificial intelligence model, a first artificial intelligence model network identifier corresponding to the first artificial intelligence model, and a first output network identifier identifying a first given output for a first given input to the first artificial intelligence model.

As referred to herein, a "run time" may include the beginning time at which the artificial intelligence model was run. In some embodiments, the run time may comprise the data associated with the results of the first run. In some embodiments, the run time may comprise the ending time at which the model was run.

The system 100 may determine a second block 104 comprising a second attribute set 114 for the first artificial intelligence model, wherein the second block 104 comprises second data generated at a second time, wherein the second attribute set 114 comprises: a second temporal network identifier corresponding to a second run time of the first artificial intelligence model, the first artificial intelligence model network identifier corresponding to the first artificial intelligence model, and a second output network identifier identifying a second given output for a second given input to the first artificial intelligence model. The system 100 may compare the first output network identifier to the second output network identifier to determine a difference in accuracy metrics. The system 100 may generate for display, on a user interface 110, a recommendation based on the difference.

The system may use a user interface. As referred to herein, a "user interface" may comprise a human-computer interaction and communication in a device, and may include display screens, keyboards, a mouse, and the appearance of a desktop. For example, a user interface may comprise a way a user interacts with an application or a website.

The system may retrieve a user profile. As referred to herein, "a user profile" and/or "user profile data" may comprise data actively and/or passively collected about a user. For example, the user profile data may comprise content generated by the user and a user characteristic for the user. A user profile may be content consumed and/or created by a user.

The system may determine a random nonce. As referred to herein, a "random nonce" may include a number chosen at random to represent an address where information is stored. In some embodiments, determining the random nonce may comprise an authentication system in a blockchain network, where the authentication system may determine a random nonce once a request has not been completed because it lacks valid authentication credentials. In some embodiments, determining the random nonce may comprise a blockchain miner creating a block and verifying it. The miner then completes the proof of work and generates the random nonce.

Figure 2:
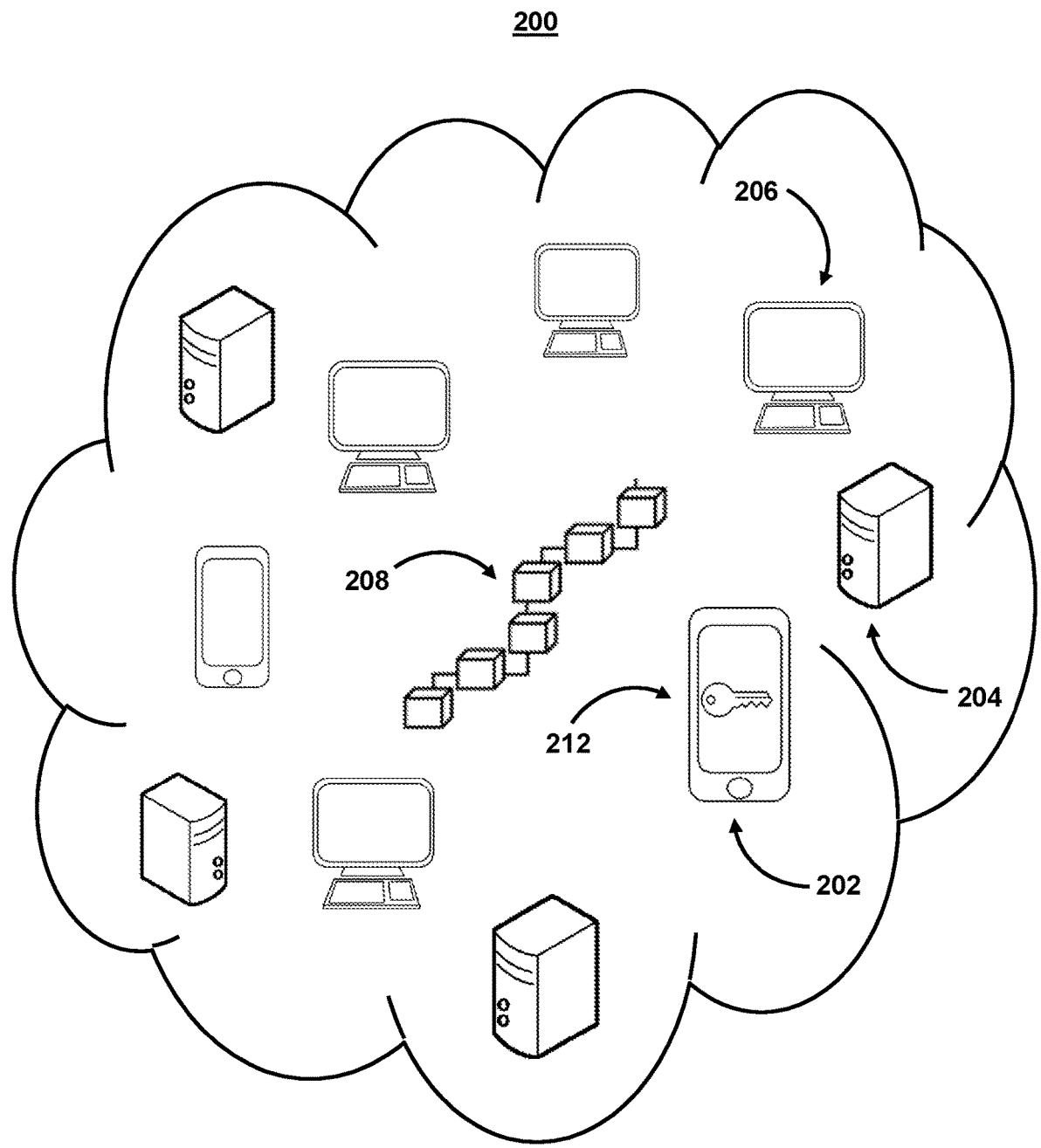
FIG. 2 shows an illustrative diagram for a decentralized environment for performing blockchain functions in a blockchain that stores artificial intelligence models, in accordance with one or more embodiments.

FIG. 2 shows an illustrative diagram for a decentralized environment for performing blockchain functions, in accordance with one or more embodiments. For example, the diagram presents various components that may be used to identify changes in accuracy of artificial intelligence models stored in blockchain network in some embodiments.

As shown in FIG. 2, system 200 may include multiple user devices (e.g., user device 202, user device 204, and/or user device 206). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of blockchain 208.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing the system 200 performing a blockchain function may equally be applied to, and correspond to, an individual user device (e.g., user device 202, user device 204, and/or user device 206) performing the blockchain function. That is, system 200 may correspond to the user devices (e.g., user device 202, user device 204, and/or user device 206) collectively or individually.

Each of the user devices may be used by the system to conduct blockchain functions and/or contribute to monitoring changes in accuracy of artificial intelligence models stored in a blockchain network. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 2, one or more user devices may include a digital wallet (e.g., digital wallet) used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain functions, while a cold wallet is generally used for managing a user account and may have no connection to the internet.

As shown in FIG. 2, one or more user devices may include a private key (e.g., key 212) and/or digital signature. For example, system 200 may use cryptographic systems for conducting blockchain functions such as monitoring changes in accuracy of artificial intelligence models stored in the blockchain network. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may comprise a plurality of nodes for the blockchain network. Each node may correspond to a user device (e.g., user device 202). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine that the blockchain function is valid. In response to validation of the block, a node user device (e.g., user device 202, user device 204, and/or user device 206) in the community network (e.g., a miner) may receive a reward (e.g., in a given cryptocurrency) as an incentive for validating the block.

To validate the blockchain function, system 200 may use one or more validation protocols and/or validation (or consensus) mechanisms. For example, system 200 may use a POW mechanism in which a user device must provide evidence that it performed computational work to validate a blockchain function and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 200 may use a POS mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

Figure 3:
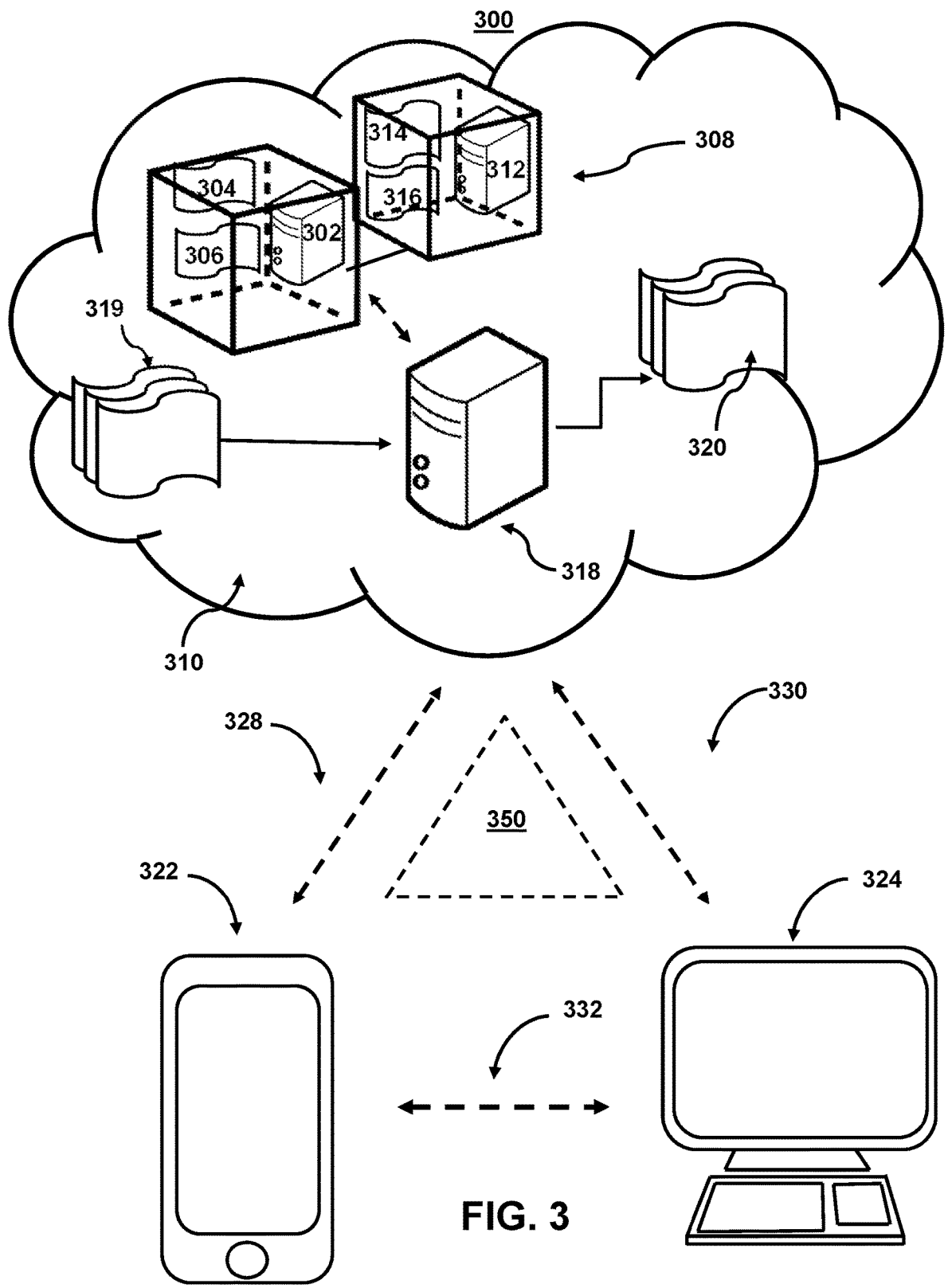
FIG. 3 shows illustrative components for a system used to monitor changes in accuracy of artificial intelligence models, in accordance with one or more embodiments.

FIG. 3 shows illustrative components for a system used to monitor changes in accuracy of artificial intelligence models stored in the blockchain network, in accordance with one or more embodiments. For example, FIG. 3 may show illustrative components for creating a digital repository of artificial intelligence models that may determine an individual fairness metric for the user, wherein the system may store the accuracy metrics of the artificial intelligence models. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may access blockchain network 308 (e.g., which in some embodiments may correspond to blockchain 208 (FIG. 2). Cloud components 310 may also access a model identifier 302 that corresponds to model 318, an input identifier 304 that corresponds to a input 319, and an output identifier 306 that corresponds to a output 320 for the model stored on the first block on the blockchain network. Additionally, cloud components 310 may access a model identifier 312, an input identifier 314 and an output identifier 316 for the model stored on the second block on the blockchain network.

Cloud components 310 may include model 318, which may be a machine learning model, artificial intelligence model, deep learning model, etc. (which may be referred collectively as "models" herein). Model 318 may take input 319 and provide output 320. The input may include multiple datasets, such as a training dataset and a test dataset. Each of the plurality of datasets (e.g., input 319) may include data subsets related to user data, predicted forecasts and/or errors, and/or actual forecasts and/or errors.

In some embodiments, the model (e.g., model 318) may automatically perform actions based on output 320. In some embodiments, the model (e.g., model 318) may not perform any actions. The output of the model (e.g., model 318) may be used to determine the accuracy metric of the artificial intelligence model stored in the blockchain network. For example, by using the output 320 of model 318 the system can determine how accurate the model 318 is based on the number of false positives and negatives.

System 300 also includes API layer 350. API layer 350 may allow the system to generate summaries across different devices. In some embodiments, API layer 350 may be implemented on user device or mobile device 322 or user terminal 324. Alternatively, or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
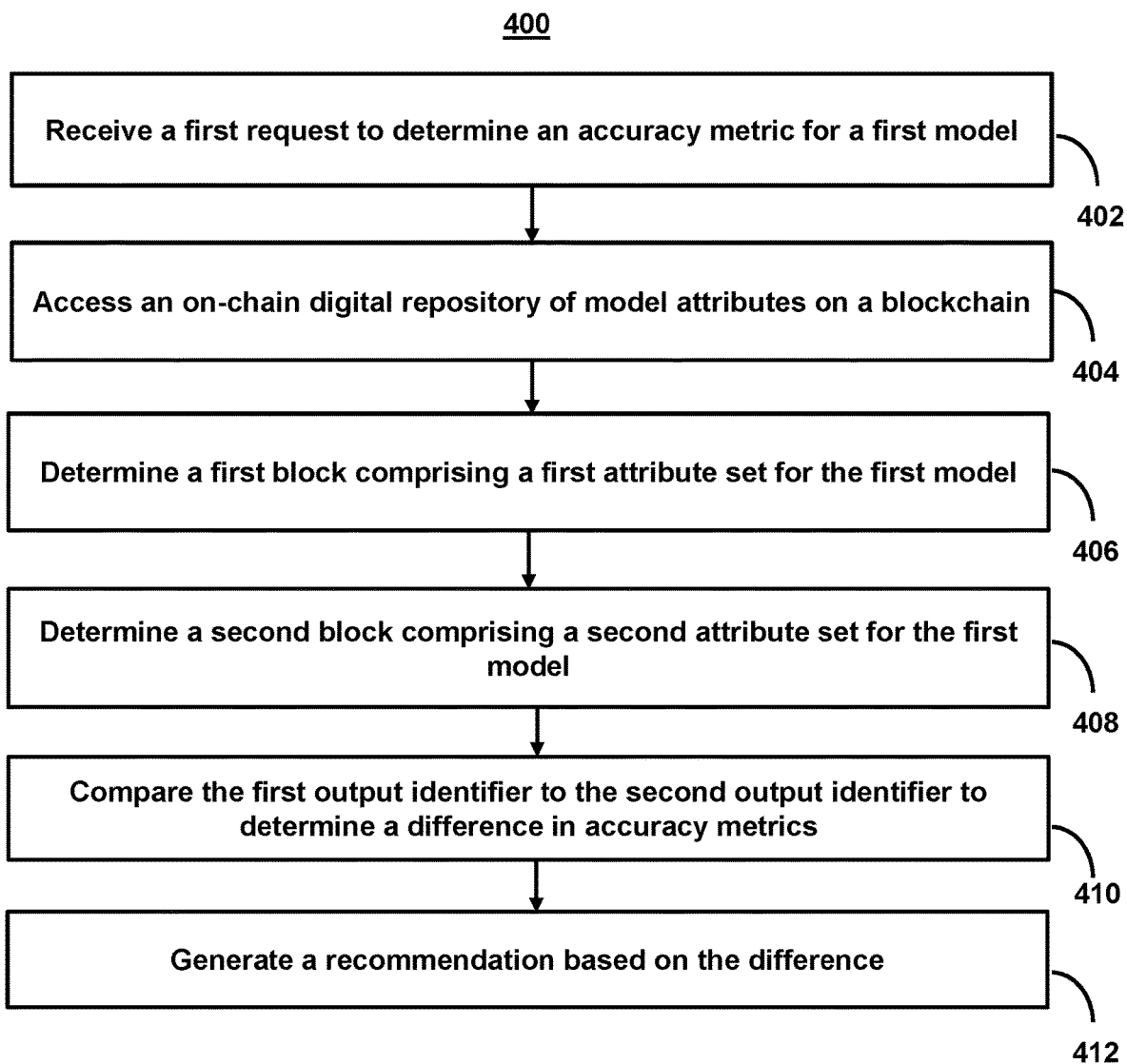
FIG. 4 shows a flowchart of the steps involved in changes in accuracy of artificial intelligence models, in accordance with one or more embodiments.

FIG. 4 shows a flowchart of the steps involved in monitoring changes in accuracy of artificial intelligence models, in accordance with one or more embodiments. For example, the system may use process 400 (e.g., as implemented on one or more system components described above) in order to create a digital repository of artificial intelligence models that may determine an individual fairness metric for the user.

At step 402, process 400 (e.g., using one or more components described above) receives a first request to determine an accuracy metric for a first model. For example, the system may receive a first request to determine an accuracy metric for a first artificial intelligence model. For example, the blockchain may receive a request from the user to determine their individual fairness metric. By doing so, the system may provide the user with a fairness metric of the model for that time that can be compared to other models.

In some embodiments, the system may determine the accuracy metric. For example, the system may receive the first given output for the first given input, wherein the first given input is included in a first dataset. The system may determine an error rate for first given output. The system may determine an average error rate for outputs of the first model for a subset of inputs from the first dataset. The system may compare the average error rate to the error rate to determine the accuracy metric. For example, the system may determine whether a model is fair for each individual dataset. For example, the system may compare the average error rate for the whole dataset to the error rate for every subgroup within the dataset. By doing so, the system may determine a fairness metric for the user. For example, the system may use the accuracy metric for the artificial intelligence model from the first run time to have a metric to compare to other accuracy metrics in other models to determine fairness for the user.

At step 404, process 400 (e.g., using one or more components described above) accesses an on-chain digital repository of model attributes on a blockchain. For example, the system may in response to receiving the first request, access an on-chain digital repository of model attributes on a blockchain network. For example, the system may access the particular information stored on the blockchain from the artificial intelligence model. By doing so, the system may store key identifiers on the blockchain network in place of storing large volumes of data on the limited space of the blockchain network.

In some embodiments, the system may access an off-chain digital repository of model attributes. For example, the system may access an off-chain digital repository of the artificial intelligence model attributes. The system may retrieve an off-chain version of the first artificial intelligence model from the off-chain digital repository. The system may process an off-chain version of the first given input in the off-chain version of the first artificial intelligence model to generate an off-chain version of the first given output. The system may generate a first hash value of the off-chain version of the first given output. The system may compare the first hash value to a second hash value, wherein the second hash value is based on the first output network identifier. For example, the system may compare an off-chain version of the model to the on-chain version. Because the on-chain version is not stored on the blockchain, the system generates a hash of it to compare to the off version. By doing so, the system may access the off-chain digital repository of model attributes to access the information needed to determine the accuracy metric of the model.

In some embodiments, the system may access the on-chain digital repository using a blockchain explorer. For example, the system may retrieve the first artificial intelligence model network identifier from the first request. The system may search, using a blockchain network explorer, the blockchain network for the first artificial intelligence model network identifier. The system may identify the first block as comprising the first attribute set based on the first artificial intelligence model network identifier. The system may extract the first attribute set. For example, the system may utilize a blockchain explorer to search for a specific artificial intelligence model runtime. By doing so, the user may be able search easily on the blockchain network for a particular artificial intelligence model for which they want to find a fairness metric for.

At step 406, process 400 (e.g., using one or more components described above) determines a first block comprising a first attribute set for the first model. For example, the system may determine a first block comprising a first attribute set for the first artificial intelligence model, wherein the first block comprises first data generated at a first time, wherein the first attribute set comprises: a first temporal network identifier corresponding to a first run time of the first artificial intelligence model, a first artificial intelligence model network identifier corresponding to the first artificial intelligence model, and a first output network identifier identifying a first given output for a first given input to the first artificial intelligence model. For example, the system may find the information stored within the blockchain that corresponds to the first runtime of the artificial intelligence model. By doing so, the system may store the key information from the first artificial intelligence model on a first block on the blockchain so that it is easier for the creator of the model to store it. For example, by storing only key information on a first block on the blockchain network, the creator of the model does not need to store all the data associated with the artificial intelligence model onto the blockchain.

In some embodiments, the system may determine an input identifier. For example, the system may determine a first input network identifier, wherein the first attribute set includes a first input network identifier for the first artificial intelligence model, wherein the first input network identifier corresponds to the first given input. For example, the system may search for a given input with an input identifier. By doing so, the user may be able to easily search for a particular input or dataset that the user wants to run on their own device through the artificial intelligence model to determine a fairness metric.

At step 408, process 400 (e.g., using one or more components described above) determines a second block comprising a second attribute set for the first model. For example, the system may determine a second block comprising a second attribute set for the first artificial intelligence model, wherein the second block comprises second data generated at a second time, wherein the second attribute set comprises: a second temporal network identifier corresponding to a second run time of the first artificial intelligence model, the first artificial intelligence model network identifier corresponding to the first artificial intelligence model, and a second output network identifier identifying a second given output for a second given input to the first artificial intelligence model. For example, the system may find the information stored within the blockchain that corresponds to the second runtime of the artificial intelligence model that may have been updated. By doing so, the system may store the key information from the first artificial intelligence model on a first block on the blockchain for a second run time. This allows the user to see if the artificial intelligence model has improved its overall fairness metric.

At step 410, process 400 (e.g., using one or more components described above) compares the first output identifier to the second output identifier to determine a difference in accuracy metrics. For example, the system may compare the first output network identifier to the second output network identifier to determine a difference in accuracy metrics. For example, the system may compare how fair the artificial intelligence model was for both run times to determine whether it has improved. By doing so, the system may easily determine a difference in accuracy metrics. For example, by using the output network identifiers, the system is easily able to find the output from the particular artificial intelligence model and determine the accuracy metrics for the given run time. After that, the system may compare and determine the difference.

In some embodiments, the system may determine a difference in accuracy metrics. For example, the system may determine a first accuracy metric based on the first output network identifier. The system may determine a second accuracy metric based on the second output network identifier. The system may compare the first accuracy metric to the second accuracy metric to determine the difference. For example, the system may determine whether the artificial intelligence model has improved its fairness metric. For example, the model may compare the fairness metric between the two runs of the same model. By doing so, the user may see whether the model has improved its fairness metric.

In some embodiments, the system may select a recommendation. For example, the system may determine the difference in accuracy metrics. The system may determine whether the difference is positive or negative. The system may select the recommendation based on whether the difference is positive or negative. For example, the system may use an incentive system for creators of artificial intelligence models to be motivated to create fairer models. For example, the system may reward the creator of the model if the model became fairer. Otherwise, the system may issue a warning to the creator. By doing so, the system is able to decide to reward the creator of the artificial intelligence for creating a fair model.

In some embodiments, the system may generate the recommendation. For example, the system may retrieve a user profile corresponding to the first model. The system may determine a blockchain network address corresponding to the user profile. The system may execute a blockchain network function corresponding to the blockchain network address based on the recommendation. For example, the system may reward the creator with cryptocurrency for improving their artificial intelligence model. By doing so, the system may be able to reward the creator of the artificial intelligence for creating a fair model.

At step 412, process 400 (e.g., using one or more components described above) generates a recommendation based on the difference. For example, the system may generate for display, on a user interface, a recommendation based on the difference. For example, the system may reward the creator with cryptocurrency for improving their artificial intelligence model. By doing so, the user is easily able to see the recommendation generated.

In some embodiments, the system may determine a random nonce. For example, the system may determine a random nonce. The system may use the random nonce to store the first given input inside hashed data groups, wherein the first given input is saved within hashes of data with a random nonce. For example, the system may determine a random nonce to store information from the first given input. This verifies that the information in the hashes has not changed which ensures the fairness metric will not be tampered with or skewed. By doing so, the system is able to store information on the blockchain network.

In some embodiments, the system may receive a second request to determine an additional accuracy metric for a second artificial intelligence model. For example, the system may receive a second request to determine an additional accuracy metric for a second artificial intelligence model. The system may, in response to receiving the second request, access the on-chain digital repository of the artificial intelligence model attributes on the blockchain network. The system may determine a third block comprises a third attribute set for a second artificial intelligence model. For example, the system may store and determine a fairness metric for multiple artificial intelligence models. By doing so, the system may store many artificial intelligence models on the blockchain to create the digital registry of the artificial intelligence models.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving a first request to determine an accuracy metric for a first artificial intelligence model; in response to receiving the first request, accessing an on-chain digital repository of model attributes on a blockchain network; determining a first block comprising a first attribute set for the first artificial intelligence model, wherein the first block comprises first data generated at a first time, wherein the first attribute set comprises: a first temporal network identifier corresponding to a first run time of the first artificial intelligence model; a first artificial intelligence model network identifier corresponding to the first artificial intelligence model; and a first output network identifier identifying a first given output for a first given input to the first artificial intelligence model; determining a second block comprising a second attribute set for the first artificial intelligence model, wherein the second block comprises second data generated at a second time, wherein the second attribute set comprises: a second temporal network identifier corresponding to a second run time of the first artificial intelligence model; the first artificial intelligence model network identifier corresponding to the first artificial intelligence model; and a second output network identifier identifying a second given output for a second given input to the first artificial intelligence model; comparing the first output network identifier to the second output network identifier to determine a difference in accuracy metrics; and generating for display, on a user interface, a recommendation based on the difference.

2. The method of any one of the preceding embodiments, wherein the first attribute set includes a first input network identifier for the first artificial intelligence model, wherein the first input network identifier corresponds to the first given input.

3. The method of any one of the preceding embodiments, further comprising: accessing an off-chain digital repository of the artificial intelligence model attributes; retrieving an off-chain version of the first artificial intelligence model from the off-chain digital repository; processing an off-chain version of the first given input in the off-chain version of the first artificial intelligence model to generate an off-chain version of the first given output; generating a first hash value of the off-chain version of the first given output; and comparing the first hash value to a second hash value, wherein the second hash value is based on the first output network identifier.

4. The method of any one of the preceding embodiments, further comprising: determining a random nonce; and using the random nonce to store the first given input inside hashed data groups, wherein the first given input is saved within hashes of data with the random nonce.

5. The method of any one of the preceding embodiments, wherein determining the accuracy metric comprises: receiving the first given output for the first given input, wherein the first given input is included in a first dataset; determining an error rate for given output; determining an average error rate for outputs of the first artificial intelligence model for a subset of inputs from the first dataset; and comparing the average error rate to the error rate to determine the accuracy metric.

6. The method of any one of the preceding embodiments, wherein determining the difference in accuracy metrics comprises: determining a first accuracy metric based on the first output network identifier; determining a second accuracy metric based the second output network identifier; and comparing the first accuracy metric to the second accuracy metric to determine the difference.

7. The method of any one of the preceding embodiments, further comprising: determining the difference in accuracy metrics; determining whether the difference is positive or negative; and selecting the recommendation based on whether the difference is positive or negative.

8. The method of any one of the preceding embodiments, further comprising: retrieving a user profile corresponding to the first artificial intelligence model; determining a blockchain network address corresponding to the user profile; and executing a blockchain network function corresponding to the blockchain network address based on the recommendation.

9. The method of any one of the preceding embodiments, wherein accessing the on-chain digital repository further comprises: retrieving the first artificial intelligence model network identifier from the first request; searching, using a blockchain network explorer, the blockchain network for the first artificial intelligence model network identifier; identifying the first block as comprising the first attribute set based on the first artificial intelligence model network identifier; and extracting the first attribute set.

10. The method of any one of the preceding embodiments, further comprising: receiving a second request to determine an additional accuracy metric for a second artificial intelligence model; in response to receiving the second request, accessing the on-chain digital repository of the artificial intelligence model attributes on the blockchain network; and determining a third block comprises a third attribute set for a second artificial intelligence model.

11. A tangible, non-transitory, machine-readable medium storing instructions that, when executed by a data processing apparatus, cause the data processing apparatus to perform operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

What is claimed is:

1. A system for monitoring changes in accuracy of artificial intelligence models by storing an artificial intelligence model in a blockchain network, the system comprising:
one or more processors; and
a non-transitory computer readable medium having instructions recorded thereon that when executed by the one or more processors causes operations comprising:
receiving a first request to determine an accuracy metric for a first artificial intelligence model, wherein the accuracy metric indicates whether an error rate for the first artificial intelligence model is consistent across all inputs corresponding to individuals in a dataset, wherein individuals refer to categories of mixed attributes in the dataset, and wherein the error rate is based on a number of false positives and negatives that the artificial intelligence model makes;
in response to receiving the first request, accessing an on-chain digital repository of artificial intelligence model attributes on a blockchain network, wherein the artificial intelligence model attributes comprise respective attribute sets for a plurality of artificial intelligence models; and
determining a first block comprising a first attribute set for the first artificial intelligence model, wherein the first block comprises first data generated at a first time, wherein the first attribute set comprises:
a first temporal network identifier corresponding to a first run time of the first artificial intelligence model;
a first artificial intelligence model network identifier corresponding to the first artificial intelligence model;
a first output network identifier identifying a first given output for a first given input to the first artificial intelligence model;
a first input network identifier for the first artificial intelligence model, wherein the first input network identifier corresponds to the first given input;
determining a second block comprising a second attribute set for the first artificial intelligence model, wherein the second block comprises second data generated at a second time, wherein the second attribute set comprises:
a second temporal network identifier corresponding to a second run time of the first artificial intelligence model;
the first artificial intelligence model network identifier corresponding to the first artificial intelligence model;
a second output network identifier identifying a second given output for a second given input to the first artificial intelligence model;
a second input network identifier for the first artificial intelligence model, wherein the second input network identifier corresponds to the second given input;
based on information stored in the first output network identifier and the second output network identifier, determining whether the first artificial intelligence model has increased or decreased its fairness by comparing the first output network identifier and the second output network identifier to determine a difference in accuracy metrics; and
generating for display, on a user interface, a recommendation based on the difference.

2. A method for monitoring changes in accuracy of artificial intelligence models, the method comprising:
receiving a first request to determine an accuracy metric for a first artificial intelligence model;
in response to receiving the first request, accessing a repository of model attributes on a blockchain network; and
determining a first block comprising a first attribute set for the first artificial intelligence model, wherein the first block comprises first data generated at a first time, wherein the first attribute set comprises:
a first temporal network identifier corresponding to a first run time of the first artificial intelligence model;
a first artificial intelligence model network identifier corresponding to the first artificial intelligence model;
a first output network identifier identifying a first given output for a first given input to the first artificial intelligence model; and
determining a second block comprising a second attribute set for the first artificial intelligence model, wherein the second block comprises second data generated at a second time, wherein the second attribute set comprises:
a second temporal network identifier corresponding to a second run time of the first artificial intelligence model;
the first artificial intelligence model network identifier corresponding to the first artificial intelligence model;

a second output network identifier identifying a second given output for a second given input to the first artificial intelligence model;

comparing the first output network identifier to the second output network identifier to determine a difference in accuracy metrics; and generating for display, on a user interface, a recommendation based on the difference.

3. The method of claim 2, wherein the first attribute set includes a first input network identifier for the first artificial intelligence model, wherein the first input network identifier corresponds to the first given input.

4. The method of claim 2, further comprising:
accessing an off-chain digital repository of the artificial intelligence model attributes;
retrieving an off-chain version of the first artificial intelligence model from the off-chain digital repository;
processing an off-chain version of the first given input in the off-chain version of the first artificial intelligence model to generate an off-chain version of the first given output;
generating a first hash value of the off-chain version of the first given output; and
comparing the first hash value to a second hash value, wherein the second hash value is based on the first output network identifier.

5. The method of claim 2, further comprising:
determining a random nonce; and
using the random nonce to store the first given input inside hashed data groups, wherein the first given input is saved within hashes of data with the random nonce.

6. The method of claim 2, wherein determining the accuracy metric comprises:
receiving the first given output for the first given input, wherein the first given input is included in a first dataset;
determining an error rate for given output;
determining an average error rate for outputs of the first artificial intelligence model for a subset of inputs from the first dataset; and
comparing the average error rate to the error rate to determine the accuracy metric.

7. The method of claim 2, wherein determining the difference in accuracy metrics comprises:
determining a first accuracy metric based on the first output network identifier;
determining a second accuracy metric based on the second output network identifier; and
comparing the first accuracy metric to the second accuracy metric to determine the difference.

8. The method of claim 2, further comprising:
determining the difference in accuracy metrics;
determining whether the difference is positive or negative; and
selecting the recommendation based on whether the difference is positive or negative.

9. The method of claim 8, further comprising:
retrieving a user profile corresponding to the first artificial intelligence model;
determining a blockchain network address corresponding to the user profile; and
executing a blockchain network function corresponding to the blockchain network address based on the recommendation.

10. The method of claim 2, wherein accessing the repository of model attributes on the blockchain network further comprises:

retrieving the first artificial intelligence model network identifier from the first request;
searching, using a blockchain network explorer, the blockchain network for the first artificial intelligence model network identifier;
identifying the first block as comprising the first attribute set based on the first artificial intelligence model network identifier; and
extracting the first attribute set.

11. The method of claim 2, further comprising:
receiving a second request to determine an additional accuracy metric for a second artificial intelligence model;
in response to receiving the second request, accessing the repository of the artificial intelligence model attributes on the blockchain network; and
determining a third block comprising a third attribute set for the second artificial intelligence model.

12. A non-transitory, computer readable medium comprising instructions that, when executed by one or more processors, cause operations comprising:
receiving a first request to determine an accuracy metric for a first artificial intelligence model;
in response to receiving the first request, accessing a repository of model attributes on a blockchain network; and
determining a first block comprising a first attribute set for the first artificial intelligence model, wherein the first block comprises first data generated at a first time, wherein the first attribute set comprises:
a first temporal network identifier corresponding to a first run time of the first artificial intelligence model;
a first artificial intelligence model network identifier corresponding to the first artificial intelligence model;
a first output network identifier identifying a first given output for a first given input to the first artificial intelligence model; and
determining a second block comprising a second attribute set for the first artificial intelligence model, wherein the second block comprises second data generated at a second time, wherein the second attribute set comprises:
a second temporal network identifier corresponding to a second run time of the first artificial intelligence model;
the first artificial intelligence model network identifier corresponding to the first artificial intelligence model;
a second output network identifier identifying a second given output for a second given input to the first artificial intelligence model;
comparing the first output network identifier to the second output network identifier to determine a difference in accuracy metrics; and
generating for display, on a user interface, a recommendation based on the difference.

13. The non-transitory, computer readable medium of claim 12, wherein the first attribute set includes a first input network identifier for the first artificial intelligence model, wherein the first input network identifier corresponds to the first given input.

14. The non-transitory, computer readable medium of claim 12, wherein the instructions cause operations further comprising:
accessing an off-chain digital repository of the artificial intelligence model attributes;

retrieving an off-chain version of the first artificial intelligence model from the off-chain digital repository;

processing an off-chain version of the first given input in the off-chain version of the first artificial intelligence model to generate an off-chain version of the first given output;

generating a first hash value of the off-chain version of the first given output; and comparing the first hash value to a second hash value, wherein the second hash value is based on the first output network identifier.

15. The non-transitory, computer readable medium of claim 12, wherein determining the accuracy metric comprises:

receiving the first given output for the first given input, wherein the first given input is included in a first dataset;

determining an error rate for the first given output;

determining an average error rate for outputs of the first artificial intelligence model for a subset of inputs from the first dataset; and comparing the average error rate to the error rate to determine the accuracy metric.

16. The non-transitory, computer readable medium of claim 12, wherein determining the difference in accuracy metrics comprises:

determining a first accuracy metric based on the first output network identifier;

determining a second accuracy metric based on the second output network identifier; and comparing the first accuracy metric to the second accuracy metric to determine the difference.

17. The non-transitory, computer readable medium of claim 12, wherein the instructions cause operations further comprising:

determining the difference in accuracy metrics;

determining whether the difference is positive or negative; and selecting the recommendation based on whether the difference is positive or negative.

18. The non-transitory, computer readable medium of claim 17, wherein the instructions cause operations further comprising:

retrieving a user profile corresponding to the first artificial intelligence model;

determining a blockchain network address corresponding to the user profile; and executing a blockchain network function corresponding to the blockchain network address based on the recommendation.

19. The non-transitory, computer readable medium of claim 12, wherein accessing the repository of model attributes on the blockchain network further comprises:

retrieving the first artificial intelligence model network identifier from the first request;

searching, using a blockchain network explorer, the blockchain network for the first artificial intelligence model network identifier;

identifying the first block as comprising the first attribute set based on the first artificial intelligence model network identifier; and extracting the first attribute set.

20. The non-transitory, computer readable medium of claim 12, wherein the instructions cause operations further comprising:

receiving a second request to determine an additional accuracy metric for a second artificial intelligence model;

in response to receiving the second request, accessing the repository of model attributes on the blockchain network; and determining a third block comprising a third attribute set for the second artificial intelligence model.

* * * * *